US010363815B2

United States Patent
Weidemann et al.

(10) Patent No.: US 10,363,815 B2
(45) Date of Patent: Jul. 30, 2019

(54) METHOD FOR OPERATING A MULTI-AXLE DRIVE DEVICE AND CORRESPONDING MULTI-AXLE DRIVE DEVICE

(71) Applicant: AUDI AG, Ingolstadt (DE)

(72) Inventors: Dieter Weidemann, Stammham (DE); Heiko Hanickel, Kipfenberg (DE); Florian Kolb, Gößweinstein (DE); Hans Jörg Brühl, Kösching (DE)

(73) Assignee: AUDI AG, Ingolstadt (DE)

( * ) Notice: Subject to any disclaimer, the term of this patent is extended or adjusted under 35 U.S.C. 154(b) by 149 days.

(21) Appl. No.: 15/524,017

(22) PCT Filed: Nov. 4, 2015

(86) PCT No.: PCT/EP2015/075759
§ 371 (c)(1),
(2) Date: May 3, 2017

(87) PCT Pub. No.: WO2016/071424
PCT Pub. Date: May 12, 2016

(65) Prior Publication Data
US 2018/0304746 A1    Oct. 25, 2018

(30) Foreign Application Priority Data
Nov. 6, 2014  (DE) .................. 10 2014 016 374

(51) Int. Cl.
*B60K 23/08*    (2006.01)

(52) U.S. Cl.
CPC .......... *B60K 23/0808* (2013.01); *B60K 23/08* (2013.01); *B60K 2023/0833* (2013.01); *B60K 2023/0858* (2013.01); *B60Y 2400/421* (2013.01)

(58) Field of Classification Search
CPC ........................... B60K 23/08; B60K 23/0808
See application file for complete search history.

(56) References Cited

U.S. PATENT DOCUMENTS 8,720,633 B2 *  5/2014  Grutter ............... B60K 17/344
                                                 180/233
9,193,263 B2 * 11/2015  Ekonen .................. B60K 17/35
(Continued)

FOREIGN PATENT DOCUMENTS

CN    102166957 A    8/2011
CN    102282032 A   12/2011
(Continued)

OTHER PUBLICATIONS

Translation of the International Preliminary Report on Patentability dated May 18, 2017, in connection with corresponding international Application No. PCT/EP2015/075759 (7 pgs.).

(Continued)

*Primary Examiner* — Kevin Hurley
(74) *Attorney, Agent, or Firm* — Maier & Maier, PLLC

(57) ABSTRACT

A device and a method for operating a multi-axle drive device. The multi-axle drive device has a synchronizing clutch present in an operative connection between a first output shaft and a connecting shaft and at least one separating clutch present in an operative connection between the connecting shaft and a second output shaft. The synchronizing clutch and the separating clutch are disengaged in a first operating state and are engaged in a second operating state. When a shifting variable exceeds a first shifting threshold during the first operating state, the synchronizing clutch is at least partially engaged and the separating clutch is engaged only when a second shifting threshold is exceeded.

9 Claims, 2 Drawing Sheets

(56) References Cited

U.S. PATENT DOCUMENTS

| | | | |
|---|---|---|---|
| 2007/0193793 A1 | 8/2007 | Burrows | |
| 2010/0038164 A1* | 2/2010 | Downs | B60K 17/348 180/248 |
| 2011/0275470 A1* | 11/2011 | Ekonen | B60K 17/35 475/198 |
| 2014/0236443 A1* | 8/2014 | Rodrigues | B60K 28/165 701/69 |

FOREIGN PATENT DOCUMENTS

| | | |
|---|---|---|
| CN | 103108766 A | 5/2013 |
| CN | 103561988 A | 2/2014 |
| DE | 102008044791 A1 | 4/2009 |
| JP | 2010096254 A | 4/2010 |
| WO | 2010085519 A1 | 7/2010 |
| WO | 2014166819 A2 | 10/2014 |

OTHER PUBLICATIONS

German Examination Report dated Jul. 7, 2015 in German application DE102014016374.1; 5 pages.
International Search Report dated Feb. 16, 2016 in International application PCT/EP2015/075759; 4 pages.
Ohinese Office Action dated Nov. 9, 2018 in corresponding Chinese patent application No. 201580059909.7; 22pgs.

\* cited by examiner

METHOD FOR OPERATING A MULTI-AXLE DRIVE DEVICE AND CORRESPONDING MULTI-AXLE DRIVE DEVICE

FIELD

The invention relates to a method for operating a multi-axle drive device, wherein the multi-axle drive device has a synchronizing clutch present in an operative connection between a first output shaft and a connecting shaft and at least one separating clutch present in an operative connection between the connecting shaft and a second output shaft, and wherein the synchronizing clutch as well as the separating clutch are disengaged in a first operating state and are engaged in a second operating state. The invention further relates to a multi-axle drive device.

BACKGROUND OF THE INVENTION

The multi-axle drive device can be used, for example, for a motor vehicle and, in particular, can be a component of the motor vehicle. The multi-axle drive device makes it possible to drive a plurality of axles—for example, a first axle, in particular a front axle, and a second axle, in particular a rear axle—of the motor vehicle. An operative connection between the axles of the motor vehicle is produced in this case via the connecting shaft, which, for example, is present as a Cardan or universal shaft. Often, it is desirable that, by means of the multi-axle drive device, multi-axle operation is carried out only intermittently, during which time a plurality of the axles are actually driven. In the case of a motor vehicle, this is necessary, for example, only when the traction would be too small if only one of the axles were driven and/or when a lateral acceleration that is too strong occurs. Therefore, it is often appropriate to drive only one of the axles by means of the multi-axle drive device.

SUMMARY OF THE DISCLOSURE

It is now the object of the invention to propose a method for operating a multi-axle drive device that offers advantages over the prior art and, in particular, enables a more rapid shifting to a multi-axle operation.

It is thereby provided that, when a first shifting threshold is exceeded by a shift variable during the first operating state, the synchronizing clutch is engaged at least partially and the separating clutch is engaged only when a second shifting threshold has been exceeded.

The multi-axle drive device makes it possible to drive optionally only one axle or a plurality of axles, in particular all axles. Accordingly, the multi-axle drive device has at least one clutch for decoupling the second axle from the first axle or the second output shaft from the first output shaft. In order to keep the moved mass of the multi-axle drive device as small as possible and, accordingly, to prevent the losses resulting from this, the connecting shaft shall not be driven when not all of the axles are driven and, in particular, when only one of the axles is driven. Accordingly, a plurality of clutches are provided.

In the scope of the multi-axle drive device presented here, at least the synchronizing clutch as well as the separating clutch are present. The synchronizing clutch is present in the operative connection between the first output shaft and the connecting shaft. The first output shaft corresponds preferably to one of the axles in this case. In the case of the motor vehicle, the first output shaft is in operative connection directly, that is, not via the synchronizing clutch and/or the separating clutch, with a drive assembly of the motor vehicle. In the operative connection, it is possible in this case to provide a gearbox, preferably a manual transmission, a differential transmission, in particular, an axle differential transmission, and/or a starting clutch. The connecting shaft, in contrast, can be connected operatively to the drive assembly only indirectly, namely via the synchronizing clutch.

The synchronizing clutch can basically be designed in any way; however, it preferably makes possible the continuous or discrete adjustment of a specific synchronizing torque between the first output shaft and the connecting shaft. The separating clutch is designed especially preferably as a positive-locking clutch, in particular as a dog clutch, and can alternatively be either fully disengaged or fully engaged. Accordingly, it does not have any intermediate positions, in which only a portion of the torque is transmitted between the connecting shaft and the second output shaft.

The second output shaft can be coupled to or can be operatively connected with the first output shaft via the connecting shaft. The second output shaft preferably corresponds to the second axle of the motor vehicle or at least a part thereof. For example, the second output shaft is associated with one wheel of the motor vehicle. The second output shaft can be connected operatively—analogously to the connecting shaft—only indirectly to the drive assembly of the motor vehicle, namely via the synchronizing clutch and the separating clutch.

In the case of the motor vehicle, for example, a plurality of and, in particular, two, second output shafts are associated with the second axle. In this case, it can be provided that the connecting shaft is connected on its side facing away from the synchronizing clutch to a differential transmission, in particular an axle differential transmission, and in this regard, is present as an input shaft for it. A second output shaft is then connected via a separating clutch to each of the two output shafts of the differential transmission, with a wheel of the motor vehicle being provided at each second output shaft on the side of the separating clutch facing away from the differential transmission. Alternatively, of course, it is also possible to provide that the two second output shafts are connected directly to the differential transmission, which, in turn, is in connection with the connecting shaft or can be connected operatively via the separating clutch to the connecting shaft.

The multi-axle drive device may be at least in the first operating state and in the second operating state. In the first operating state, both the synchronizing clutch and the separating clutch are fully disengaged, so that no torque is transmitted. Accordingly, the connecting shaft is decoupled fully both from the first output shaft and from the second output shaft, so that it is not driven and is preferably at a standstill. This applies preferably in the case of the above-described embodiment, which has the differential transmission, to this embodiment as well. The connecting shaft and/or the differential transmission need not be dragged along, so that, in the first operating state, the energy otherwise consumed for this is saved. In the second operating state, in contrast, both the synchronizing clutch and the separating clutch are engaged at least partially, in particular fully, so that a driving torque applied to the first output shaft, for example, is distributed evenly onto the first output shaft and the second output shaft.

When the first shifting threshold is exceeded by the shifting variable during the first operating state, the synchronizing clutch is then to be engaged at least partially and the separating clutch is to be engaged only when the second shifting threshold is exceeded. The second shifting threshold is, for example, greater than the first shifting threshold. It is therefore provided that a shift from the first operating state to the second operating state is to be conducted not only when the shifting variable exceeds a single shifting threshold, which usually corresponds to the second shifting threshold. Instead, preparatory measures should already be taken beforehand, so that the actual engagement of the second output shaft can occur substantially faster than was previously possible.

For this purpose, a multi-stage method—for example, a two-stage method—is proposed, in which, initially, the synchronizing clutch is at least partially engaged, on the one hand, in order to prepare the synchronizing clutch for a full engagement or, on the other hand, already to accelerate the connecting shaft and/or the possibly present differential transmission, that is, to bring them to a higher rotational speed. Obviously, a combination of these measures is also possible.

The synchronizing clutch is preferably present in a ventilating position, in which a large air gap of the synchronizing clutch is created, in the first operating state, that is, when it is fully disengaged. In the first operating state, this serves to reduce losses further. Preferably, in this regard, the partial engagement of the synchronizing clutch is initially and preferably only to be understood to mean that the synchronizing clutch is shifted out of a disengaged position in the direction of its engagement, with this occurring by a reduction of the air gap, which, in the process, is preferably not eliminated, however.

In this case, the preparation of the synchronizing clutch therefore occurs especially preferably in such a way that, although it is partially engaged in order to reduce the air gap, a position of the synchronizing clutch in which no torque continues to be transmitted between the first output shaft and the connecting shaft is chosen and adjusted at the synchronizing clutch. Alternatively, however, the synchronizing clutch can be adjusted in such a way that a portion of the applied torque is already transmitted from the first output shaft to the second connecting shaft.

These measures are conducted at least in part when the shifting variable attains or exceeds the first shifting threshold. The separating clutch, in contrast, is engaged only, in particular fully, when the shifting variable also attains or exceeds the second shifting threshold, with the second shifting threshold being greater than the first shifting threshold. If the shifting variable exceeds the first shifting threshold, but then drops below it once again before it has attained the second shifting threshold, then, although the synchronizing clutch is initially at least partially engaged, the separating clutch, however, remains disengaged. When the shifting variable drops below the first shifting threshold, the synchronizing clutch, too, is disengaged fully once again or brought into its ventilating position, so that, once again, the first operating state is present and is not changed to the second operating state.

With the aid of the described method, it is possible to accelerate substantially the actual shift in a multi-axle operation or the change from the first operating state to the second operating state, because, when the shifting variable exceeds the second shifting threshold, the necessary preparatory measures have already been taken, that is, for example, the synchronizing clutch has been shifted out of its ventilating position and/or the connecting shaft and/or the differential transmission have or has already been accelerated in terms of the rotational speed thereof.

A preferred embodiment of the invention provides that the partial engagement of the synchronizing clutch is carried out in such a way that the air gap of the synchronizing clutch is reduced, but not eliminated. Such a procedure has already been addressed above. In the first operating state, the synchronizing clutch is in its ventilating position, which is characterized by an especially large air gap. When the synchronizing clutch is engaged, the air gap is then reduced, but not completely eliminated, so that torque is no longer transmitted between the first output shaft and the connecting shaft. To this extent, the shifting variable subsequently also exceeds the second shifting threshold, then the air gap is already reduced. Accordingly, the synchronizing clutch can be brought into its engaged position far faster, in which it is preferably fully engaged.

A preferred embodiment of the invention provides that the partial closure of the synchronizing clutch is carried out in such a way that a specific torque is transmitted between the first output shaft and the connecting shaft. Additionally or alternatively to the above embodiments in terms of the engagement of the synchronizing clutch, the air gap of the synchronizing clutch is therefore not only reduced, but completely eliminated. In the process, the synchronizing clutch is adjusted for transmission of the specific torque between the first output shaft and the connecting shaft, for example, by appropriate choice of a contact pressure of clutch members, in particular, clutch disks. However, the separating clutch continues to remain fully disengaged, so that, via the synchronizing clutch, only the connecting shaft and/or the differential transmission, but not the second output shaft, are or is driven by the first output shaft with the specific torque.

An enhancement of the invention provides that the specific torque is chosen in such a way that the rotational speed of the connecting shaft does not change. The connecting shaft and/or the differential transmission that is operatively connected permanently to the connecting shaft have or has a specific inertia, which is reflected in the form of moments of inertia. These moments of inertia counteract an acceleration of the connecting shaft and/or of the differential transmission. Likewise, the connecting shaft and/or the differential transmission are or is exposed to friction torques, which likewise counteract the acceleration. The friction torques are caused, for example, by a bearing of the connecting shaft and/or of the differential transmission.

Even when a torque is applied to the connecting shaft, the case can arise that, for this reason, its rotational speed does not change and, in particular, does not increase. The specific torque shall then be chosen in such a way that this is precisely the case. In this regard, a torque differing from zero is transmitted via the synchronizing clutch, although said torque is not sufficient to accelerate the connecting shaft. In this regard, a clutch grinding of the synchronizing clutch is provided.

Another embodiment of the invention provides that the specific torque is chosen in such a way that the connecting shaft can be brought to a default rotational speed. The default rotational speed can basically be chosen at will. For example, it corresponds to the rotational speed of the second output shaft or at least to a fraction thereof. For example, the default rotational speed is at least 10%, at least 20%, at least 30%, at least 40%, at least 50%, at least 60%, at least 70%, at least 80%, at least 90% or at least 95% of the rotational speed of the second output shaft or corresponds to it.

Another advantageous embodiment of the invention provides that, when the shifting variable goes below the first shifting threshold, the synchronizing clutch is disengaged. Reference has already been made to this case. If the shifting variable drops below the first shifting threshold, without having attained or exceeded beforehand the second shifting threshold, then the synchronizing clutch is disengaged once again and, in particular, is fully disengaged, without the separating clutch having been engaged after the shifting variable exceeded directly beforehand the first shifting threshold. The described preparatory measures were carried out without a complete shift to the second operating state actually having occurred.

Although, for the preparation of the shift, a specific energy input is required, this pays off, in particular in terms of driving comfort and/or acoustic properties of the motor vehicle, when the separating clutch is indeed engaged and hence is shifted into the second operating state. Obviously, it is possible additionally or alternatively to provide at least one further condition, for which, when it is met, the synchronizing clutch is disengaged.

An especially preferred embodiment of the invention provides that the separating clutch is engaged only when the connecting shaft has attained the default rotational speed. Therefore, in this regard, it is not sufficient that the shifting variable has attained or exceeded the second shifting threshold. Instead, the rotational speed of the connecting shaft must additionally correspond to the default rotational speed in order to make possible a coupling without any recoil.

In an enhancement of the invention, it is provided that the default rotational speed corresponds to the rotational speed of the second output shaft. Reference to this has already been made above. Likewise, the default rotational speed can be a fraction of the rotational speed of the second output shaft. It is also possible for the default rotational speed to be chosen initially to be smaller than the rotational speed of the second output shaft when the shifting variable attains or exceeds the first shifting threshold. It is possible, the longer this state persists and/or the faster the shifting variable increases in the direction of the second shifting threshold, to increase the default rotational speed from the initially chosen default rotational speed in the direction of the rotational speed of the second output shaft. This occurs, in particular, predicatively, so that the default rotational speed corresponds to the rotational speed of the second output shaft once the shifting variable attains or exceeds the second shifting threshold.

Finally, it can be provided that, as shifting variable, a state variable of a motor vehicle is used, in particular, the slippage of at least one wheel of the motor vehicle. With the aid of the multi-axle drive device, it is possible in the second operating state for the drive torque to be distributed over the first output shaft and the second output shaft, whereas, in the first operating state, it is applied solely to the first output shaft. Accordingly, as a result of the multi-axle drive operation carried out in the second operating state, the slippage of the driven wheels of the motor vehicle is reduced in comparison to the first operating state. In order to prevent a slippage that is too strong, the slippage of at least one of the wheels and, in particular, of all currently driven wheels of the motor vehicle, shall be used as shifting variable.

The invention further relates to a multi-axle drive device, in particular for implementing the method described above, wherein the multi-axle drive device has a synchronizing clutch present in an operative connection between a first output shaft and a connecting shaft and at least one separating clutch present in an operative connection between the connecting shaft and a second output shaft, and wherein the synchronizing clutch as well as the separating clutch are disengaged in a first operating state and are engaged in a second operating state. It is thereby provided that the multi-axle drive device is designed in such a way that, when a shifting variable exceeds a first shifting threshold during the first operating state, the synchronizing clutch is at least partially engaged and the separating clutch is engaged only when a second shifting threshold is exceeded.

The advantages of such a design of the multi-axle drive device or of the corresponding procedure have already been addressed. Both the multi-axle drive device and the method can be enhanced in accordance with the above embodiments, so that reference is made to them in this regard.

Obviously, the invention is also directed at a motor vehicle having a multi-axle drive device of this kind, wherein, here, too, the multi-axle drive device can be enhanced in accordance with the above embodiments.

BRIEF DESCRIPTION OF THE DRAWINGS

The invention will be discussed in detail below on the basis of the exemplary embodiments illustrated in the drawing, without any limitation of the invention thereby occurring. Shown are.

DETAILED DESCRIPTION OF THE DRAWINGS

Figure 1:
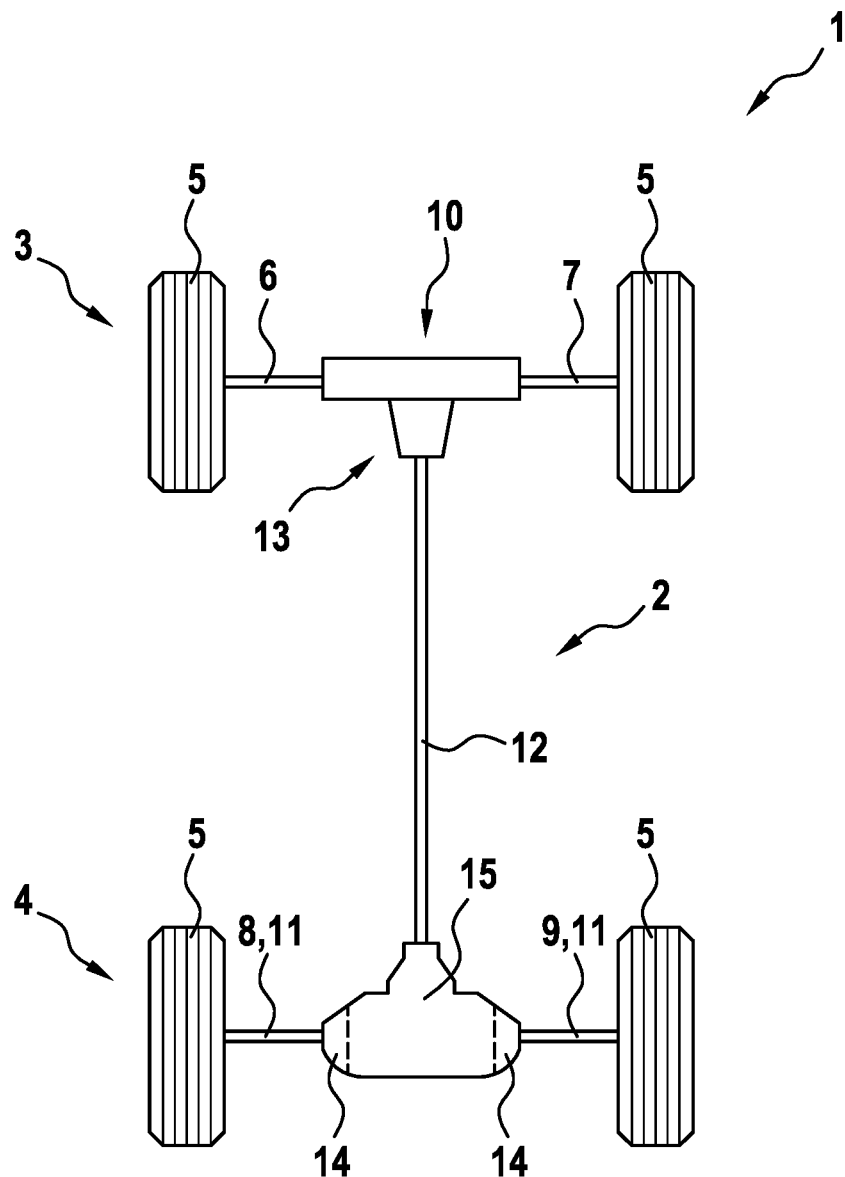
FIG. 1 a schematic illustration of a drive train of a motor vehicle, which has a multi-axle drive device, and FIG. 2 several diagrams, in which a position of a synchronizing clutch, a default rotational speed for a connecting shaft, an actual rotational speed of the connecting shaft, and a position of a separating clutch are each plotted over time.

FIG. 1 shows a drive train 1 for a motor vehicle, which is not further illustrated. The drive train 1 has a multi-axle drive device 2, which serves for alternative operation of only a first axle 3 or of the first axle 3 as well as a second axle 4. In the exemplary embodiment illustrated here, each of the axles 3 and 4 has two wheels 5, which are arranged on axle members 6 and 7 of the first axle 3 and on axle members 8 and 9 of the second axle 4. It can then be provided that the axle members 6 and 7 of the first axle 3 form a first output shaft 10. Especially preferably, however, they are connected via a differential transmission, in particular, an axle differential transmission, to the first output shaft 10, that is, in particular, operatively connected to it rigidly and/or permanently. The axle members 8 and 9 can each exist as a second output shaft 11. Alternatively, it can be provided that the axle members 8 and 9 are connected via a differential transmission, in particular, an axle differential transmission, to the second output shaft 11.

The multi-axle drive device 2 has a connecting shaft 12, via which an operative connection can be produced between the first axle 3 and the second axle 4. The connecting shaft 12 is preferably designed as a Cardan shaft. Arranged in an operative connection between the first output shaft 10 and the connecting shaft 12 is a synchronizing clutch 13. The synchronizing clutch 13 is preferably designed as a force-fitting clutch. It makes possible, in particular, the transmission of any portion of the applied torque. Arranged in an operative connection between the connecting shaft 12 and the second output shaft 11 is, in addition, a separating clutch 14. In the exemplary embodiment illustrated here, there are two separating clutches 14, with, in each case, one of the separating clutches 14 being arranged between a differential transmission 15 and one of the two second output shafts 11 or the axle members 8 and 9.

In this case, the connecting shaft 12 is operatively connected rigidly and/or permanently to the differential transmission 15. The operative connection between the differential transmission 15 and hence the connecting shaft 12, on the one hand, as well as the second output shafts 11 in the form of the axle members 8 and 9, on the other hand, can alternatively be produced or disconnected with the aid of the separating clutch 14. Preferably, the separating clutches 14 always are found in the same position, so that either an operative connection between the connecting shaft 12, on the one hand, and the axle members 8 and 9, on the other hand, is produced or disconnected.

In a first operating state of the multi-axle drive device 2, the synchronizing clutch 13 and the separating clutch 14 are disengaged, so that the operative connection between the first output shaft 10 and the second output shaft 11 is disconnected. Insofar as, in the following discussion, only a separating clutch 14 or a second output shaft 11 is mentioned, both output shafts 11 or both separating clutches 14 are always meant in the scope of the present exemplary embodiment. In a second operating state, the synchronizing clutch 13 and the separating clutch 14 are fully engaged. The separating clutch 14 is preferably designed as a form-fitting or positive-locking clutch, in particular, as a dog clutch.

Figure 2:
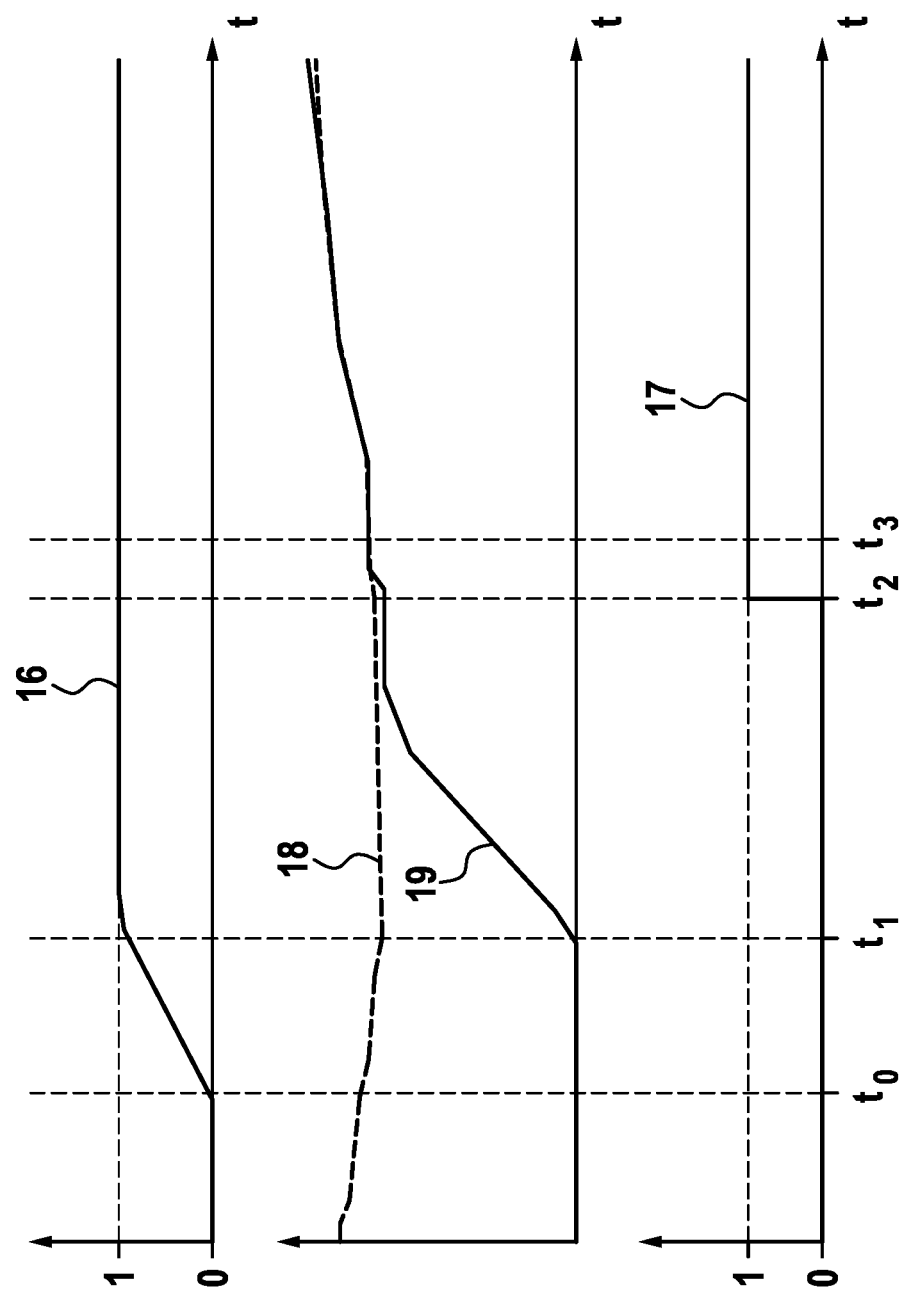

A method for operating the multi-axle drive device 2 in accordance with the above embodiments is described on the basis of FIG. 2. In the top diagram, a curve 16 shows the current position of the synchronizing clutch 13 between a fully disengaged position ("0" or 0%) and a synchronizing position ("1" or 100%), which preferably corresponds to a fully engaged position. A curve 17 indicates the current position of the separating clutch 14, likewise between a fully disengaged position ("0") and a fully engaged position ("1"). A curve 18 describes a default rotational speed for the connecting shaft 12; finally, a curve 19 describes the actual current rotational speed of the connecting shaft 12.

At a point in time $t=t_0$, a shifting variable attains or exceeds a first shifting threshold. Employed as shifting variable is, for example, a state variable of the motor vehicle, in particular, the slippage of at least one wheel of the motor vehicle. Once the shifting variable attains or exceeds the first shifting threshold, the multi-axle drive device 2 is to be prepared for a shift of the operating state from the first operating state in the direction of the second operating state. For this purpose, the synchronizing clutch 13 is at least partially engaged, as may be inferred for the time period $t_0 < t \leq t_1$ from curve 16.

In this case, a specific torque for the synchronizing clutch 13 is chosen in such way that the rotational speed of the connecting shaft 12 is not altered. The synchronizing clutch 13 is adjusted in such a way that the specific torque is transferred between the first output shaft 10 and the connecting shaft 12. This state of the synchronizing clutch 13 is reached at the point in time $t=t_1$. Subsequently, if the shifting variable is still larger than or equal to the first shifting threshold, the specific torque is chosen in such a way that the connecting shaft 12 is accelerated to the default rotational speed in accordance with curve 18. For this purpose, the synchronizing clutch 13 is fully engaged during the time period $t_1 < t \leq t_2$, so that the rotational speed of the connecting shaft 12 is increased in accordance with curve 19 and adjusted essentially to the default rotational speed in accordance with curve 18.

If the shifting variable then exceeds a second shifting threshold, which preferably is greater than the first shifting threshold, and if the rotational speed of the connecting shaft 12 corresponds to the default rotational speed, which, in turn, is equal to the rotational speed of the second output shaft 11, then the separating clutch 14 is also engaged, this occurring at the point in time $t=t_2$ in accordance with curve 17. Subsequently, the rotational speed of the connecting shaft 12 is consequently always equal to the default rotational speed, which in the exemplary embodiment illustrated here always corresponds to the rotational speed of the second output shaft 11.

With the procedure described above, the shift from the first operating state to the second operating state does not occur in a single step, but rather in a multi-stage manner. Initially, the shift is prepared by at least partially engaging the synchronizing clutch 13 so that either the air gap of the synchronizing clutch is reduced, but not eliminated, or else a specific torque is transmitted between the first output shaft 10 and the connecting shaft 12, while the separating clutch 14 continues to remain disengaged. Only when the shifting variable exceeds the second shifting threshold is the separating clutch 14 also ultimately engaged, so that the actual engagement of the second axle 4 with the aid of the multi-axle drive device 2 can occur within an extremely short time period.

The invention claimed is:

1. A method for operating a multi-axle drive device,
wherein the multi-axle drive device comprises:
a synchronizing clutch present in an operative connection between a first output shaft and a connecting shaft; and
at least one separating clutch present in an operative connection between the connecting shaft and a second output shaft,
wherein the synchronizing clutch and the separating clutch are disengaged in a first operating state and are engaged in a second operating state, the method comprising:
at least partially engaging the synchronizing clutch when a shifting variable exceeds a first shifting threshold during the first operating state, such that the synchronizing clutch is shifted out of a disengaged position in a direction of its engagement, and
engaging the separating clutch only when the shifting variable exceeds a second shifting threshold,
wherein the second shifting threshold is greater than the first shifting threshold.

2. The method according to claim 1, wherein the partial engagement of the synchronizing clutch is carried out so that an air gap of the synchronizing clutch is reduced, but not eliminated.

3. The method according to claim 1, wherein the partial engagement of the synchronizing clutch is carried out so that a specific torque is transmitted between the first output shaft and the connecting shaft.

4. The method according to claim 3, wherein the specific torque is chosen so that a rotational speed of the connecting shaft does not change.

5. The method according to claim 3, wherein the specific torque is chosen so that the connecting shaft is brought to a default rotational speed.

6. The method according to claim 1, wherein when the shifting variable exceeds the first shifting threshold, the synchronizing clutch is disengaged.

7. The method according to claim 5, wherein the separating clutch is engaged only when the connecting shaft has attained the default rotational speed.

8. The method according to claim 5, wherein the default rotational speed corresponds to the rotational speed of the second output shaft.

9. The method according to claim 1, wherein the shifting variable is a state variable of a motor vehicle, the state variable being a slippage of at least one wheel of the multi-axle drive device.

\* \* \* \* \*